G. F. MISH.
SLED.
APPLICATION FILED JULY 24, 1919.

1,392,783.

Patented Oct. 4, 1921.
2 SHEETS—SHEET 1.

Witnesses
G. W. Walling
V. B. Hillyard

Inventor
George F. Mish
By Richard Beaven
Attorney

G. F. MISH.
SLED.
APPLICATION FILED JULY 24, 1919.

1,392,783. Patented Oct. 4, 1921.
2 SHEETS—SHEET 2.

Witnesses
G. W. Walling
U. B. Hillyard.

Inventor
George F. Mish
By Richard Bleven,
Attorney

UNITED STATES PATENT OFFICE.

GEORGE F. MISH, OF INWOOD, WEST VIRGINIA.

SLED.

1,392,783.  Specification of Letters Patent.  Patented Oct. 4, 1921.

Application filed July 24, 1919. Serial No. 312,903.

*To all whom it may concern:*

Be it known that I, GEORGE F. MISH, a citizen of the United States, residing at Inwood, in the county of Berkeley and State of West Virginia, have invented certain new and useful Improvements in a Sled, of which the following is a specification.

The invention has relation to sleds and has for its object to facilitate the steering, particularly when the sled is coasting.

In accordance with this invention, the sled is provided with runners which are hingedly connected to the lower ends of hangers or knees, so as to turn about longitudinal axes, said runners being connected for simultaneous movement. A spring coacts with the runners to normally hold them in a given position. A steering bar mounted upon the sled coacts with the runners to effect a pivotal movement thereof, whereby the sled may be properly steered.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the accompanying drawings.

Corresponding and like parts are referred to in the following description and indicated in the several views of the drawings by like reference characters.

Figure 1:
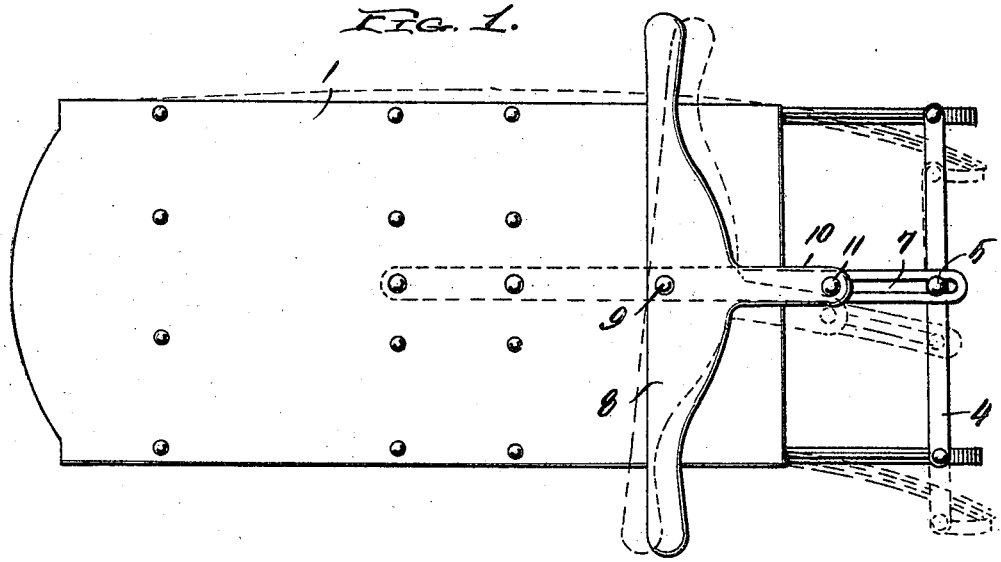
Figure 1 is a top plan view of a sled embodying the invention, the dotted lines showing an adjusted position of the runners and parts coöperating therewith.
Figure 2:
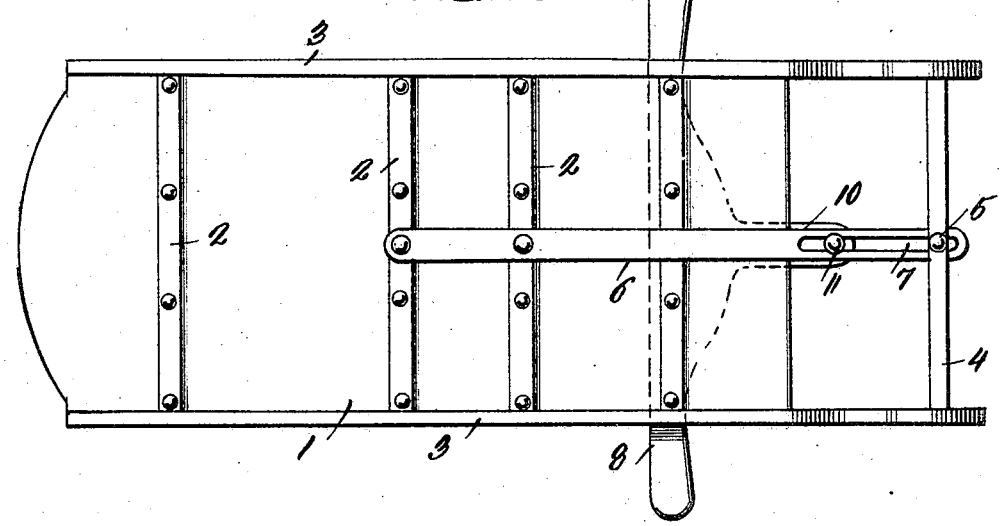
Fig. 2 is a view of the sled inverted.
Figure 3:
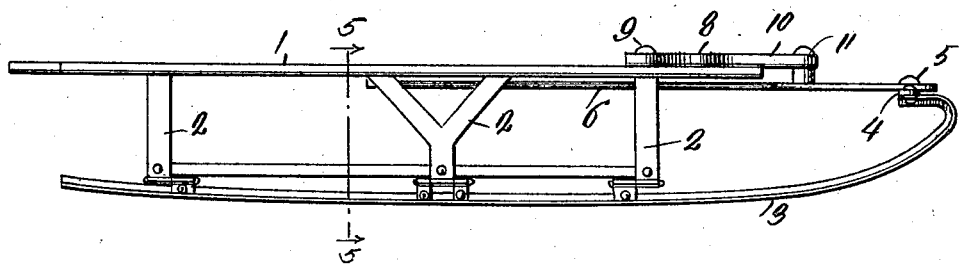
Fig. 3 is a side view of the sled.
Figure 4:
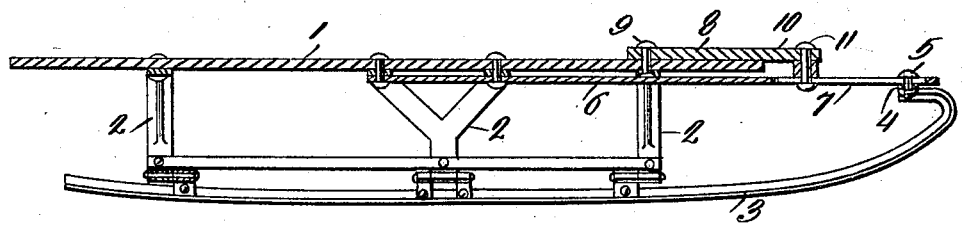
Fig. 4 is a vertical central longitudinal section.
Figure 5:
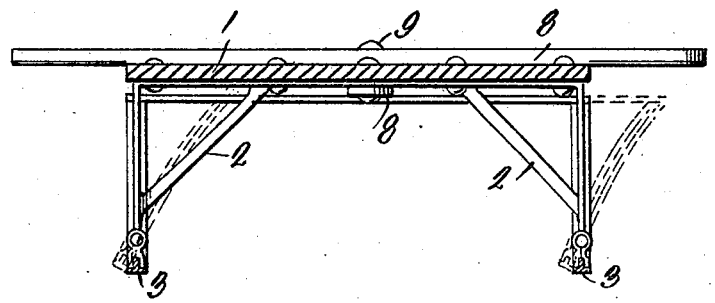
Fig. 5 is a transverse section on the line 5—5 of Fig. 3.

The sled comprises a platform or seat board 1, which may be of any construction. A plurality of hangers or knees 2 is provided and secured to the platform 1 in any convenient and substantial manner. These parts may be of ordinary construction. The runners 3 are hingedly connected to the lower ends of the hangers or knees 2, so as to swing laterally. The lower faces of the runners are flat crosswise and curve longitudinally. The forward ends of the runners curve upwardly, thence rearwardly and are connected by means of a cross bar 4, which is pivoted at its ends to the rearwardly extending ends of the runners. A pin 5 projects vertically from the cross bar 4 and is disposed centrally thereof.

A spring bar 6 is disposed beneath the platform 1 and is firmly connected thereto at its rear end. This spring bar is disposed longitudinally and midway between the sides of the sled and its forward portion is freed and extends to a point beyond the cross bar 4. A longitudinal slot 7 is formed in the forward portion of the spring bar 6 and receives the pin 5. The purpose of the spring bar 6 is to hold the runners in a given position, so that the sled may move forward in a direct line. The sled is steered by moving the cross bar 4, either to the right or to the left and such movement deflects the forward portion of the spring bar 6. When the force exerted to move the cross bar 4, either to the right or to the left is relaxed, the spring bar 6 reacts to return the cross bar 4 and the runners to a normal position.

A steering bar 8 is mounted upon the platform 1 and is pivoted centrally therethrough by a suitable fastening 9. The ends of the steering bar project beyond the sides of the sled to be readily engaged by the feet or the hands of the person guiding the sled when coasting. An extension 10 projects forwardly from the steering bar 8 in line with the pivot 9 and is provided at its front end with a depending pin 11 which engages the slot 7 of the spring bar 6. It will thus be understood that pivotal movement of the steering bar results in a corresponding movement of the extension 10, with the result that the pin 11 carried thereby is moved laterally, thereby effecting a corresponding movement of the forward portion of the spring bar, whereby the runners are turned either to the right or to the left, so as to guide the sled in the required direction.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A sled provided along its sides with hangers, runners hingedly connected to the lower ends of the hangers, a spring bar having connection with the runners to normally hold them in a given position and a steering member having connection with the runners for turning them against the tension of the spring bar when it is required to steer the sled.

2. A sled provided along its sides with hangers, runners hingedly connected to the lower ends of the hangers, a spring bar having connection with the runners to normally hold them in a given position and a steering member having connection with the spring bar to effect deflection thereof and a turning of the runners when it is required to steer the sled.

3. A sled provided along its sides with hangers, runners hingedly connected to the lower ends of the hangers, a spring bar secured at one end to the sled and having its opposite end portion longitudinally slotted, connecting means between the runners and spring bar and having a portion extending into the longitudinal slot thereof, a steering bar pivotally connected with the sled and connecting means between the steering bar and said spring bar and engaging the longitudinal slot of the latter.

4. A sled provided along its sides with hangers, runners hingedly connected to the lower ends of the hangers, a cross bar connecting the runners, a longitudinally disposed spring bar secured at one end to the sled and having its opposite end portion longitudinally slotted, an element engaging the longitudinal slot of the spring bar and connected with the said cross bar, a steering bar pivotally mounted upon the sled and connecting means between the steering bar and spring bar and operating in the longitudinal slot of the latter.

In testimony whereof I affix my signature in presence of two witnesses.

GEORGE F. MISH.

Witnesses:
C. C. CUSHION,
W. H. BOWERS.